(12) United States Patent
Deng et al.

(10) Patent No.: US 11,711,008 B2
(45) Date of Patent: Jul. 25, 2023

(54) LOSS OPTIMIZATION CONTROL METHOD FOR MODULAR MULTILEVEL CONVERTERS UNDER FAULT-TOLERANT CONTROL

(71) Applicant: SOUTHEAST UNIVERSITY, Nanjing (CN)

(72) Inventors: Fujin Deng, Nanjing (CN); Mengyue Wang, Nanjing (CN); Jifeng Zhao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/784,999

(22) PCT Filed: Feb. 9, 2022

(86) PCT No.: PCT/CN2022/075683
§ 371 (c)(1),
(2) Date: Jun. 13, 2022

(87) PCT Pub. No.: WO2022/257491
PCT Pub. Date: Dec. 15, 2022

(65) Prior Publication Data
US 2023/0139631 A1 May 4, 2023

(30) Foreign Application Priority Data
Jun. 7, 2021 (CN) .......................... 202110632789.2

(51) Int. Cl.
*H02M 7/483* (2007.01)
*H02M 1/00* (2006.01)
*H02M 1/32* (2007.01)

(52) U.S. Cl.
CPC ....... *H02M 1/0051* (2021.05); *H02M 1/0012* (2021.05); *H02M 1/325* (2021.05); *H02M 7/4835* (2021.05); *H02M 7/4837* (2021.05)

(58) Field of Classification Search
CPC .......................... H02M 7/4835; H02M 7/4837
See application file for complete search history.

(56) References Cited

U.S. PATENT DOCUMENTS

| | | | |
|---|---|---|---|
| 2016/0013716 A1* | 1/2016 | Hur ...................... | H02M 7/4835 363/50 |
| 2018/0083550 A1 | 3/2018 | Chung et al. | |

FOREIGN PATENT DOCUMENTS

| | | |
|---|---|---|
| CN | 103324843 A | 9/2013 |
| CN | 103715935 A | 4/2014 |

(Continued)

OTHER PUBLICATIONS

Yu, Yuan et al., Thermal Balance Control Method of Modular Multilevel Converters, Power System Technology, vol. 45, issue 1, Jan. 31, 2021, pp. 364-371.

(Continued)

*Primary Examiner* — Gary A Nash
(74) *Attorney, Agent, or Firm* — Muncy, Geissler, Olds & Lowe, P.C.

(57) ABSTRACT

A loss optimization control method for modular multilevel converters (MMCs) under fault-tolerant control is disclosed. The method includes the following steps: when a fault of a SM in a MMC occurs, bypassing the faulty SM to achieve fault-tolerant control; suppressing the fundamental circulating current using a fundamental circulating current controller; respectively calculating the loss of each SM in faulty arms and healthy arms by using loss expressions of different switching tubes in SMs of the MMC; aiming at the loss imbalance between the arms of the MMC, taking the loss of a healthy SM as the reference, adjusting the period of (Continued)

capacitor voltage sorting control in the faulty SMs, achieving the loss control over the working SMs in the faulty SMs, and finally achieving the loss balance of each SM in the faulty arms and the healthy arms. Compared with the conventional methods, the proposed method is easier to implement and does not increase the construction cost of MMCs.

7 Claims, 3 Drawing Sheets

(56) References Cited

FOREIGN PATENT DOCUMENTS

| CN | 106533227 | A |   | 3/2017 |   |          |
|----|-----------|---|---|--------|---|----------|
| CN | 107612290 | A |   | 1/2018 |   |          |
| CN | 108933535 | A |   | 12/2018|   |          |
| CN | 110224622 | A | * | 9/2019 |   | H02M 7/483 |
| CN | 110289779 | A |   | 9/2019 |   |          |
| CN | 111211675 | A | * | 5/2020 |   | H02M 1/32 |
| CN | 111917316 | A |   | 11/2020|   |          |
| CN | 112886840 | A |   | 6/2021 |   |          |
| CN | 113285626 | A |   | 8/2021 |   |          |
| WO | WO-2015074620 | A1 | * | 5/2015 |   | H02H 7/12 |

OTHER PUBLICATIONS

Zhao, Jifeng et al., Harmonic Circulating Current Injection Based Power Loss Optimization Control of Bottom Switch/Diodes for Modular Multilevel Converters, CSEE Journal of Power and Energy Systems, vol. 7, issue 6, Apr. 30, 2021, pp. 1213-1226.

* cited by examiner

LOSS OPTIMIZATION CONTROL METHOD FOR MODULAR MULTILEVEL CONVERTERS UNDER FAULT-TOLERANT CONTROL

TECHNICAL FIELD

The present disclosure belongs to the field of multilevel power electronic converters, and in particular, to a loss optimization control method for modular multilevel converters (MMCs) under fault-tolerant control.

BACKGROUND

MMCs, adopting a modular structure, are widely concerned in the fields of flexible direct current transmission, renewable energy grid connection, motor drivers, etc. due to the advantages of high reliability, the excellent output performance, high efficiency, efficient failure management, etc.

Since a MMC includes a large number of sub-modules (SMs), each SM may be considered as a potential failure point. The faulty SMs are bypassed to achieve fault-tolerant control, which may distort the voltage and current and affect the normal operation of the MMC since the number of SMs in faulty arms and normal arms is not equal. The loss of the operating SMs in faulty arms will increase. If the loss of the faulty arms is not restricted, the performance of the MMC would be affected. Therefore, it is essential to balance the loss of the faulty arms and the healthy arms according to the loss difference.

The conventional methods such as topology optimization, capacitor voltage control and modulation strategy optimization can keep the MMC operation as normal. However, the construction cost of MMCs and the complexity of control algorithms will increase and the loss imbalance is ignored, which will restrict the application of the methods above.

To solve the problems mentioned above, a loss optimization control method for MMCs under fault-tolerant control is now proposed.

SUMMARY

In view of the deficiencies of the prior art, an objective of the present disclosure is to provide a loss optimization control method for MMCs under fault-tolerant control. By comparing the loss difference between respective SMs in faulty arms and healthy arms, the period of capacitor voltage sorting control in the SMs of the faulty arms will be changed. By adjusting the losses of the SMs of the faulty arms, the losses among arms are re-balanced. Compared with the conventional methods, the proposed method does not increase the construction cost of MMCs.

The objective of the present disclosure may be achieved by the following technical solution:

A loss optimization control method for MMCs under fault-tolerant control includes the following steps:

S1, when a fault of a SM in any arm of a MMC occurs during normal operation, bypassing the faulty SM in the faulty arm to achieve fault-tolerant control;

S2, suppressing the fundamental circulating current using a fundamental circulating current controller;

S3, respectively calculating the loss of each SM in faulty arms and healthy arms by using loss expressions of different switching tubes in SMs of the MMC;

S4, aiming at the loss imbalance between the arms of the MMC, taking the loss of a healthy SM as the reference, adjusting the period of capacitor voltage sorting control in the faulty SMs, achieving the loss control over the working SMs in the faulty SMs, and finally achieving the loss balance of each SM in the faulty arms and the healthy arms.

Further, a calculation formula for the loss $P_{Loss}$ of each SM in MMCs in S3 is:

$$P_{Loss}=P_{on\_T1}+P_{off\_T1}+P_{con\_T1}+P_{on\_T2}+P_{off\_T2}+P_{con\_T2}+P_{rec\_D1}+P_{con\_D1}+P_{rec\_D2}+P_{con\_D2} \quad (1)$$

In the formula (1), $P_{on\_T1}$ is the turn-on loss of a first power switch T1 of a SM. $P_{off\_T1}$ is the turn-off loss of the first power switch T1 of the SM, $P_{con\_T1}$ is the conduction loss of the first power switch T1 of the SM, $P_{on\_T2}$ is the turn-on loss of a second power switch T2 of the SM, $P_{off\_T2}$ is the turn-off loss of the second power switch T2 of the SM. $P_{con\_T2}$ is the conduction loss of the second power switch T2 of the SM, $P_{rec\_D1}$ is the reverse recovery loss of a first diode D1 of the SM, $P_{con\_D1}$ is the conduction loss of the first diode D1 of the SM, $P_{rec\_D2}$ is the reverse recovery loss of a second diode D2 of the SM, and $P_{con\_D2}$ is the conduction loss of the second diode D2 of the SM.

Further, calculation formulas for $P_{on\_T1}$, $P_{off\_T1}$, and $P_{con\_T1}$ are:

$$\begin{cases} P_{on\_T1} = \dfrac{1}{T}\sum_{0}^{T}\left[E_{on}(i_{t1}(t)) \cdot \dfrac{U_{sm}}{U_{ref}}\right] \\ P_{off\_T1} = \dfrac{1}{T}\sum_{0}^{T}\left[E_{off}(i_{t1}(t)) \cdot \dfrac{U_{sm}}{U_{ref}}\right] \\ P_{con\_T1} = \dfrac{1}{T}\int_{0}^{T} i_{t1} \cdot S \cdot (V_{CE} + R_{CE} \cdot i_{t1} \cdot S) dt \end{cases} \quad (2)$$

In the formulas (2), $i_{t1}$ is the conducting current through the T1, $E_{on}$ is the turn-on energy of an IGBT, $E_{off}$ is the turn-off energy of the IGBT, $U_{ref}$ is the test voltage in a data table, $U_{sm}$ is the average capacitor voltage of the SM, $V_{CE}$ is the zero-current forward ON-state voltage drop of the diode, $R_{CE}$ is the zero-current forward ON-state resistance of the diode, T is the fundamental period of the system, $T=2\pi/\omega$, $\omega$ is the fundamental angular frequency of the system, S is a switching signal of the SM, when S=1, the SM is inserted into the SM, and when S=0, the SM is bypassed.

Further, calculation formulas for $P_{on\_T2}$, $P_{off\_T2}$, and $P_{con\_T2}$ are:

$$\begin{cases} P_{on\_T2} = \dfrac{1}{T}\sum_{0}^{T}\left[E_{on}(i_{t2}(t)) \cdot \dfrac{U_{sm}}{U_{ref}}\right] \\ P_{off\_T2} = \dfrac{1}{T}\sum_{0}^{T}\left[E_{off}(i_{t2}(t)) \cdot \dfrac{U_{sm}}{U_{ref}}\right] \\ P_{con\_T2} = \dfrac{1}{T}\int_{0}^{T} i_{t2} \cdot (1-S) \cdot (V_{CE} + R_{CE} \cdot i_{t2} \cdot (1-S)) dt \end{cases} \quad (3)$$

In the formulas (3), $i_{t2}$ is the conducting current through the T2.

Further, calculation formulas for $P_{rec\_D1}$ and $P_{con\_D1}$ are:

$$\begin{cases} P_{rec\_D1} = \dfrac{1}{T}\sum_{0}^{T}\left[E_{rec}(i_{d1}(t)) \cdot \dfrac{U_{sm}}{U_{ref}}\right] \\ P_{con\_D1} = \dfrac{1}{T}\int_{0}^{T} i_{d1} \cdot S \cdot (V_F + R_F \cdot i_{d1} \cdot S) dt \end{cases} \quad (4)$$

In the formulas (4), $E_{rec}$ is the reverse recovery energy of the diode, $i_{d1}$ is the conducting current through the D1, $V_F$ is the zero-current forward ON-state voltage drop of the diode, and $R_F$ is the ON-state resistance of the diode.

Further, calculation formulas for $P_{rec\_D2}$ and $P_{con\_D2}$ are:

$$\begin{cases} P_{rec\_D2} = \frac{1}{T}\sum_{0}^{T}\left[E_{rec}(i_{d2}(t))\cdot\frac{U_{sm}}{U_{ref}}\right] \\ P_{con\_D2} = \frac{1}{T}\int_{0}^{T} i_{d2}\cdot(1-S)\cdot(V_F + R_F\cdot i_{d2}\cdot(1-S))dt \end{cases} \quad (5)$$

In the formulas (5), $i_{d2}$ is the conducting current through the D2.

Further, the control method for adjusting the period of capacitor voltage sorting control in S4 is: monitoring the losses of the working SMs in the faulty arms and the SMs in the healthy arms in real time; if the loss of the working SMs in the faulty arms exceeds the loss of the SMs in the healthy arms, prolonging the period of capacitor voltage sorting control; and if the loss of the working SMs in the faulty arms is less than the loss of the SMs in the healthy arms, declining the period of capacitor voltage sorting control.

Further, the control period is the time interval between two acts of capacitor voltage sorting in the SMs of the arms.

Beneficial effects of the present disclosure.

1. According to the loss optimization control method for MMCs under fault-tolerant control provided in the present disclosure, by comparing the losses of respective SMs in faulty arms and healthy arms, the period of capacitor voltage sorting control in the faulty arms is adjusted. The loss balance of each SM in the faulty arms and the healthy arms is achieved. This control algorithm is simple and easy to implement.

2. According to the loss optimization control method for MMCs under fault-tolerant control provided in the present disclosure, the loss balance of each SMs in the faulty arms and healthy arms can be achieved only by adjusting the period of capacitor voltage sorting control using a simple closed-loop controller based on the information of loss difference between the faulty SMs and the healthy SMs. The changes in the topology structure of SMs of MMCs and the increase in the construction cost of MMCs are avoided, which leads to easy implementation in existing MMC systems and strong practicality.

3. The loss optimization control method for MMCs under fault-tolerant control provided in the present disclosure achieves loss balance control of each SM in the faulty arms and the healthy arms and has no bad impact on the quality of electricity output.

BRIEF DESCRIPTION OF THE DRAWINGS

To describe the technical solutions in the embodiments of the present disclosure or in the related art more clearly, the following briefly describes the accompanying drawings required for describing the embodiments or the related art. Apparently, persons of ordinary skill in the art may still derive other drawings from these accompanying drawings without creative efforts.

DETAILED DESCRIPTION

The technical solutions in the embodiments of this application will be described below with reference to the accompanying drawings in the embodiments of this application. Obviously, the described embodiments are a part of this application, but not all of them. Based on the embodiments of the invention, all other embodiments obtained by those of ordinary skill in the art without going through any creative work shall fall within the scope of protection of the invention.

Figure 1:
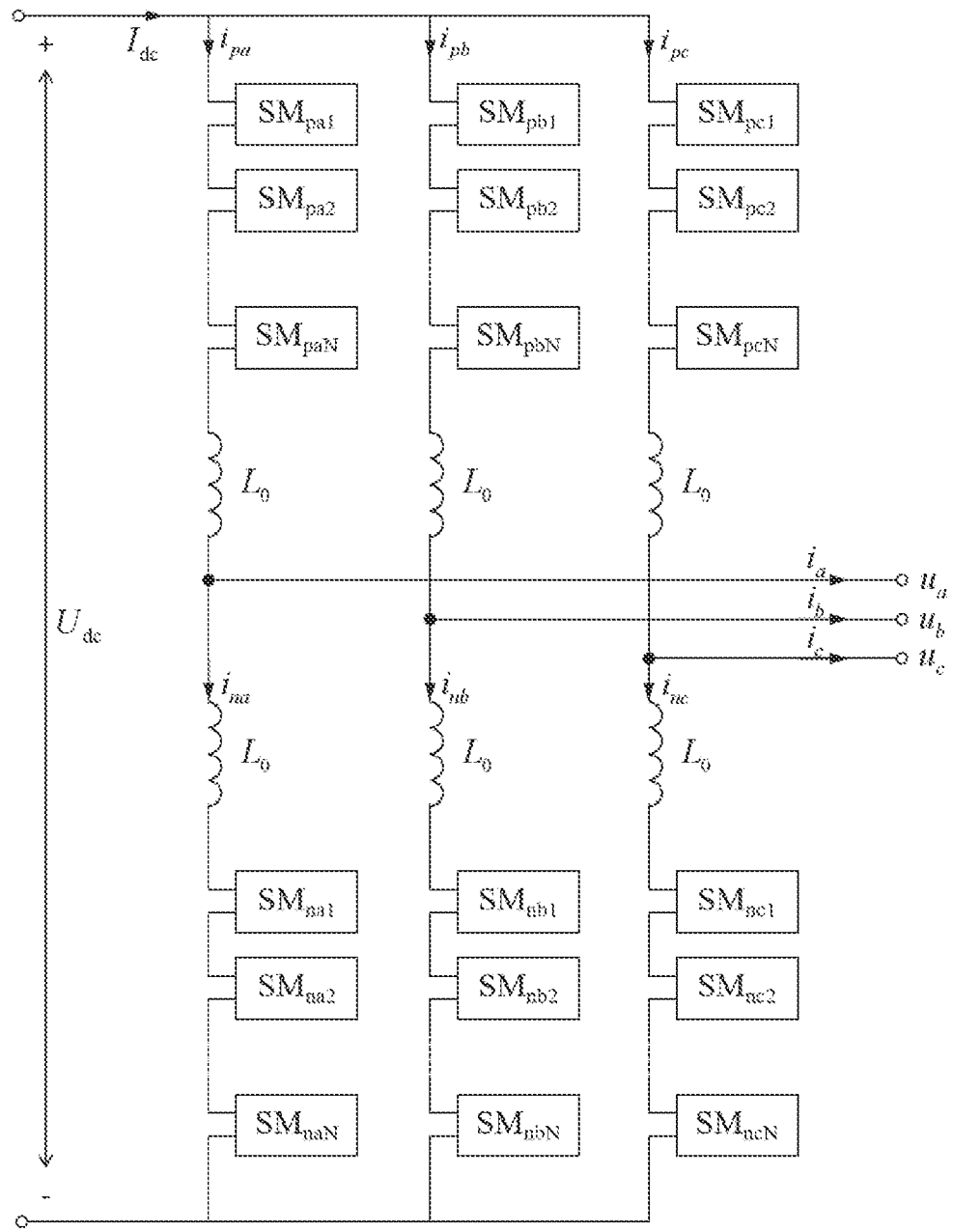
FIG. 1 is a schematic diagram of a topology structure of a three-phase MMC according to an embodiment of the present disclosure.
Figure 2:
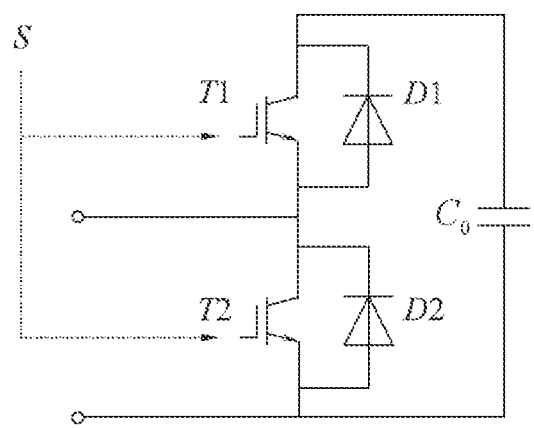
FIG. 2 is a schematic diagram of a topology structure of a half-bridge SM according to an embodiment of the present disclosure.

Aiming at the problem of loss optimization of MMCs under SM faults, the present disclosure provides a loss optimization control method for MMCs under fault-tolerant control. The topology structures of a three-phase MMC and SMs are as shown in FIGS. 1 and 2 respectively. A three-phase MMC is composed of six arms. Each arm consists of N (N is a positive integer) topologically-identical SMs and an arm inductor $L_0$. The SM is of a half-bridge structure, and is composed of two diodes D1, D2, two IGBT power switches T1, T2, and a capacitor $C_0$.

Figure 3:
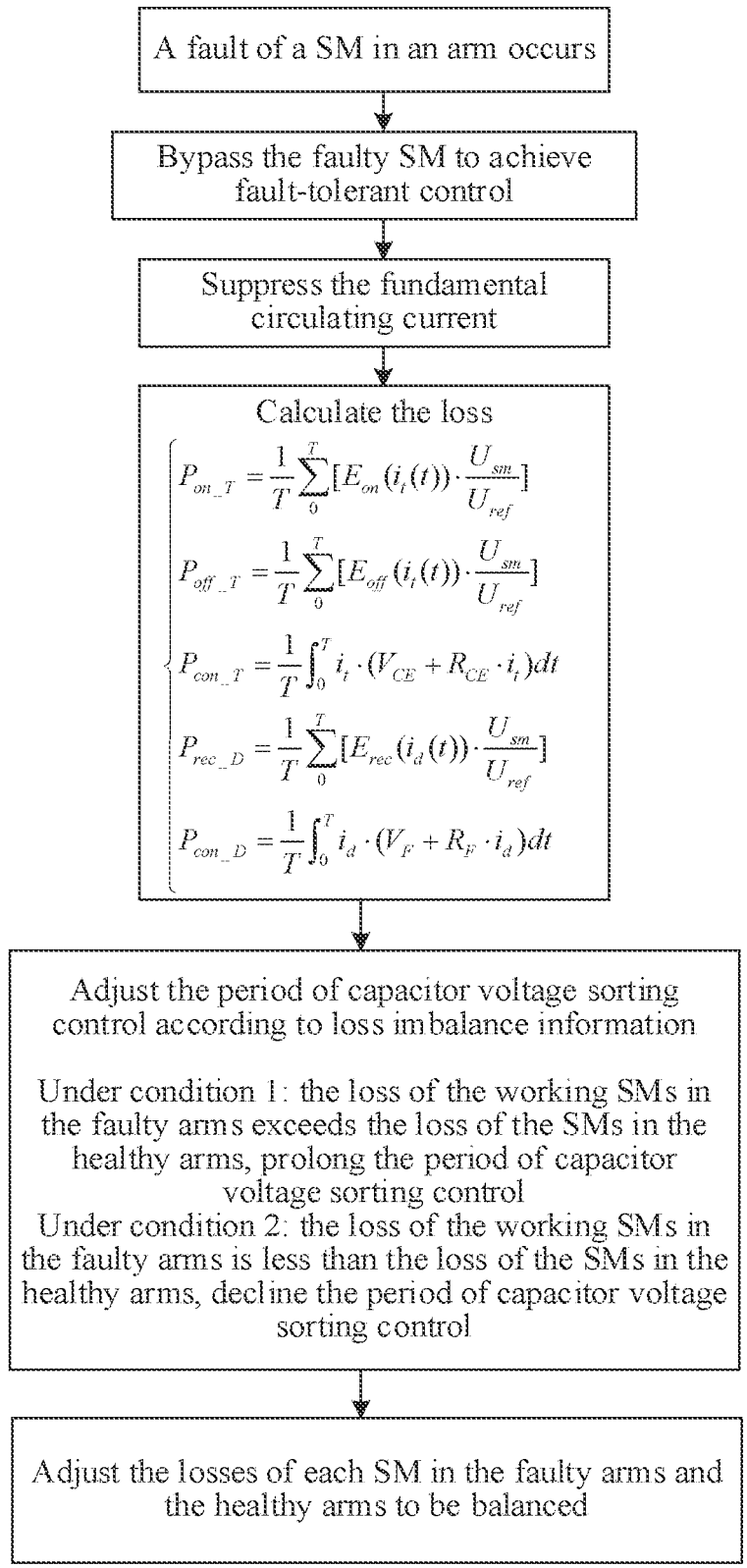
FIG. 3 is a flowchart of an overall method according to an embodiment of the present disclosure.

As shown in FIG. 3, a loss optimization control method for MMCs under fault-tolerant control includes: when a fault of a SM in a MMC occurs, bypassing the faulty SM to achieve fault-tolerant control; suppressing the fundamental circulating current using a fundamental circulating current controller; respectively calculating the loss of each SM in faulty arms and healthy arms by using loss expressions of different switching tubes in SMs of the MMC; aiming at the loss imbalance between the arms of the MMC, taking the loss of a healthy SM as the reference, adjusting the period of capacitor voltage sorting control in the faulty SMs, achieving the loss control over the working SMs in the faulty SMs, and finally achieving the loss balance of each SM in the faulty arms and the healthy arms.

The method specifically includes the following steps:

S1. When a fault of a SM in any arm of a MMC occurs during normal operation, bypass the faulty SM in the faulty arm to achieve fault-tolerant control.

S2. Suppress the fundamental circulating current using a fundamental circulating current controller.

S3. Respectively calculate the loss of each SM in faulty arms and healthy arms by using loss expressions of different switching tubes in SMs of the MMC.

S4. Aiming at the loss imbalance between the arms of the MMC, take the loss of a healthy SM as the reference, adjust the period of capacitor voltage sorting control in the faulty SMs, achieve the loss control over the working SMs in the faulty SMs, and finally achieve the loss balance of each SM in the faulty arms and the healthy arms.

A calculation formula for the loss $P_{Loss}$ of each SM in MMCs in S3 is:

$$P_{Loss} = P_{on\_T1} + P_{off\_T1} + P_{con\_T1} + P_{on\_T2} + P_{off\_T2} + P_{con\_T2} + P_{rec\_D1} + P_{con\_D1} + P_{rec\_D2} + P_{con\_D2} \quad (1)$$

In the formula (1), $P_{on\_T1}$ is the turn-on loss of a first power switch T1 of a SM, $P_{off\_T1}$ is the turn-off loss of the first power switch T1 of the SM, $P_{con\_T1}$ is the conduction loss of the first power switch T1 of the SM, $P_{on\_T2}$ is the turn-on loss of a second power switch T2 of the SM, $P_{off\_T2}$ is the turn-off loss of the second power switch T2 of the SM, $P_{con\_T2}$ is the conduction loss of the second power switch T2 of the SM, $P_{rec\_D1}$ is the reverse recovery loss of a first diode D1 of the SM, $P_{con\_D1}$ is the conduction loss of the first diode D1 of the SM, $P_{rec\_D2}$ is the reverse recovery loss of a second diode D2 of the SM, and $P_{con\_D2}$ is the conduction loss of the second diode D2 of the SM.

Calculation formulas for $P_{on\_T1}$, $P_{off\_T1}$, and $P_{con\_T1}$ are:

$$\begin{cases} P_{on\_T1} = \frac{1}{T}\sum_0^T\left[E_{on}(i_{t1}(t))\cdot\frac{U_{sm}}{U_{ref}}\right] \\ P_{off\_T1} = \frac{1}{T}\sum_0^T\left[E_{off}(i_{t1}(t))\cdot\frac{U_{sm}}{U_{ref}}\right] \\ P_{con\_T1} = \frac{1}{T}\int_0^T i_{t1}\cdot S\cdot(V_{CE}+R_{CE}\cdot i_{t1}\cdot S)dt \end{cases} \quad (2)$$

In the formulas (2), $i_{t1}$ is the conducting current through the T1, $E_{on}$ is the turn-on energy of an IGBT, $E_{off}$ is the turn-off energy of the IGBT, $U_{ref}$ is the test voltage in a data table, $U_{sm}$ is the average capacitor voltage of the SM, $V_{CE}$ is the zero-current forward ON-state voltage drop of the diode, $R_{CE}$ is the zero-current forward ON-state resistance of the diode, T is the fundamental period of the system, $T=2\pi/\omega$, $\omega$ is the fundamental angular frequency of the system, S is a switching signal of the SM, when S=1, the SM is inserted into the SM, and when S=0, the SM is bypassed.

Calculation formulas for $P_{on\_T2}$, $P_{off\_T2}$, and $P_{con\_T2}$ are:

$$\begin{cases} P_{on\_T2} = \frac{1}{T}\sum_0^T\left[E_{on}(i_{t2}(t))\cdot\frac{U_{sm}}{U_{ref}}\right] \\ P_{off\_T2} = \frac{1}{T}\sum_0^T\left[E_{off}(i_{t2}(t))\cdot\frac{U_{sm}}{U_{ref}}\right] \\ P_{con\_T2} = \frac{1}{T}\int_0^T i_{t2}\cdot(1-S)\cdot(V_{CE}+R_{CE}\cdot i_{t2}\cdot(1-S))dt \end{cases} \quad (3)$$

In the formulas (3), $i_{t2}$ is the conducting current through the T2.

Calculation formulas for $P_{rec\_D1}$ and $P_{con\_D1}$ are:

$$\begin{cases} P_{rec\_D1} = \frac{1}{T}\sum_0^T\left[E_{rec}(i_{d1}(t))\cdot\frac{U_{sm}}{U_{ref}}\right] \\ P_{con\_D1} = \frac{1}{T}\int_0^T i_{d1}\cdot S\cdot(V_F+R_F\cdot i_{d1}\cdot S)dt \end{cases} \quad (4)$$

In the formulas (4), $E_{rec}$ is the reverse recovery energy of the diode, $i_{d1}$ is the conducting current through the D1, $V_F$ is the zero-current forward ON-state voltage drop of the diode, and $R_F$ is the ON-state resistance of the diode.

Calculation formulas for $P_{rec\_D2}$ and $P_{con\_D2}$ are:

$$\begin{cases} P_{rec\_D2} = \frac{1}{T}\sum_0^T\left[E_{rec}(i_{d2}(t))\cdot\frac{U_{sm}}{U_{ref}}\right] \\ P_{con\_D2} = \frac{1}{T}\int_0^T i_{d2}\cdot(1-S)\cdot(V_F+R_F\cdot i_{d2}\cdot(1-S))dt \end{cases} \quad (5)$$

In the formulas (5), $i_{d2}$ is the conducting current through the D2.

The control method for adjusting the period of capacitor voltage sorting control in S4 is: monitoring the losses of the working SMs in the faulty arms and the SMs in the healthy arms in real time; if the loss of the working SMs in the faulty arms exceeds the loss of the SMs in the healthy arms, prolonging the period of capacitor voltage sorting control; and if the loss of the working SMs in the faulty arms is less than the loss of the SMs in the healthy arms, declining the period of capacitor voltage sorting control.

The control period is the time interval between two acts of capacitor voltage sorting in the SMs of the arms.

In the descriptions of this specification, a description of a reference term such as "an embodiment", "an example", or "a specific example" means that a specific feature, structure, material, or characteristic that is described with reference to the embodiment or the example is included in at least one embodiment or example of the present disclosure. In this specification, exemplary descriptions of the foregoing terms do not necessarily refer to the same embodiment or example. In addition, the described specific features, structures, materials, or characteristics may be combined in a proper manner in any one or more of the embodiments or examples.

The foregoing displays and describes basic principles, main features of the present disclosure and advantages of the present disclosure. A person skilled in the art may understand that the present disclosure is not limited to the foregoing embodiments. Descriptions in the embodiments and this specification only illustrate the principles of the present disclosure. Various modifications and improvements are made in the present disclosure without departing from the spirit and the scope of the present disclosure, and these modifications and improvements shall fall within the protection scope of the present disclosure.

What is claimed is:

1. A loss optimization control method for modular multilevel converters (MMCs) under fault-tolerant control, comprising the following steps:

S1, when a fault of a sub-module (SM) in any arm of a MMC occurs during normal operation, bypassing the faulty SM in the faulty arm to achieve fault-tolerant control;

S2, suppressing the fundamental circulating current using a fundamental circulating current controller;

S3, respectively calculating the loss of each SM in faulty arms and healthy arms by using loss expressions of different switching tubes in SMs of the MMC;

S4, aiming at the loss imbalance between the arms of the MMC, taking the loss of a healthy SM as the reference, adjusting the period of capacitor voltage sorting control in the faulty SMs, achieving the loss control over the working SMs in the faulty SMs, and finally achieving the loss balance of each SM in the faulty arms and the healthy arms, wherein the control method for adjusting the period of capacitor voltage sorting control in S4 is: monitoring the losses of the working SMs in the faulty arms and the SMs in the healthy arms in real time; if the loss of the working SMs in the faulty arms exceeds the loss of the SMs in the healthy arms, prolonging the period of capacitor voltage sorting control; and if the loss of the working SMs in the faulty arms is less than the loss of the SMs in the healthy arms, declining the period of capacitor voltage sorting control.

2. The loss optimization control method for MMCs under fault-tolerant control according to claim 1, wherein a calculation formula for a loss $P_{Loss}$ of each SM in the MMC in S3 is:

$$P_{Loss}=P_{on\_T1}+P_{off\_T1}+P_{con\_T1}+P_{on\_T2}+P_{off\_T2}+P_{con\_T2}+P_{rec\_D1}+P_{con\_D1}+P_{rec\_D2}+P_{con\_D2} \quad (1)$$

in the formula (1), $P_{on\_T1}$ is the turn-on loss of a first power switch T1 of a SM, $P_{off\_T1}$ is the turn-off loss of the first power switch T1 of the SM, $P_{con\_T1}$ is the conduction loss of the first power switch T1 of the SM, $P_{on\_T2}$ is the turn-on loss of a second power switch T2 of the SM, $P_{off\_T2}$ is the turn-off loss of the second power switch T2 of the SM, $P_{con\_T2}$ is the conduction loss of the second power switch T2 of the SM, $P_{rec\_D1}$ is the reverse recovery loss of a first diode D1 of the SM, $P_{con\_D1}$ is the conduction loss of the first diode D1 of the SM, $P_{rec\_D2}$ is the reverse recovery loss of a second diode D2 of the SM, and $P_{con\_D2}$ is the conduction loss of the second diode D2 of the SM.

3. The loss optimization control method for MMCs under fault-tolerant control according to claim 2, wherein calculation formulas for $P_{on\_T1}$, $P_{off\_T1}$, and $P_{con\_T1}$ are:

$$\begin{cases} P_{on\_T1} = \frac{1}{T}\sum_0^T \left[E_{on}(i_{t1}(t)) \cdot \frac{U_{sm}}{U_{ref}}\right] \\ P_{off\_T1} = \frac{1}{T}\sum_0^T \left[E_{off}(i_{t1}(t)) \cdot \frac{U_{sm}}{U_{ref}}\right] \\ P_{con\_T1} = \frac{1}{T}\int_0^T i_{t1} \cdot S \cdot (V_{CE} + R_{CE} \cdot i_{t1} \cdot S)dt \end{cases} \quad (2)$$

in the formulas (2), $i_{t1}$ is the conducting current through the T1, $E_{on}$ is the turn-on energy of an IGBT, $E_{off}$ is the turn-off energy of the IGBT, $U_{ref}$ is the test voltage in a data table, $U_{sm}$ is the average capacitor voltage of the SM, $V_{CE}$ is the zero-current forward ON-state voltage drop of the diode, $R_{CE}$ is the zero-current forward ON-state resistance of the diode, T is the fundamental period of the system, T=$2\pi/\omega$, $\omega$ is the fundamental angular frequency of the system, S is a switching signal of the SM, when S=1, the SM is inserted into the SM, and when S=0, the SM is bypassed.

4. The loss optimization control method for MMCs under fault-tolerant control according to claim 3, wherein calculation formulas for $P_{on\_T2}$, $P_{off\_T2}$, and $P_{con\_T2}$ are:

$$\begin{cases} P_{on\_T2} = \frac{1}{T}\sum_0^T \left[E_{on}(i_{t2}(t)) \cdot \frac{U_{sm}}{U_{ref}}\right] \\ P_{off\_T2} = \frac{1}{T}\sum_0^T \left[E_{off}(i_{t2}(t)) \cdot \frac{U_{sm}}{U_{ref}}\right] \\ P_{con\_T2} = \frac{1}{T}\int_0^T i_{t2} \cdot (1-S) \cdot (V_{CE} + R_{CE} \cdot i_{t2} \cdot (1-S))dt \end{cases} \quad (3)$$

in the formulas (3), $i_{t2}$ is the conducting current through the T2.

5. The loss optimization control method for MMCs under fault-tolerant control according to claim 4, wherein calculation formulas for $P_{rec\_D1}$ and $P_{con\_D1}$ are:

$$\begin{cases} P_{rec\_D1} = \frac{1}{T}\sum_0^T \left[E_{rec}(i_{d1}(t)) \cdot \frac{U_{sm}}{U_{ref}}\right] \\ P_{con\_D1} = \frac{1}{T}\int_0^T i_{d1} \cdot S \cdot (V_F + R_F \cdot i_{d1} \cdot S)dt \end{cases} \quad (4)$$

in the formulas (4), $E_{rec}$ is the reverse recovery energy of the diode, $i_{d1}$ is the conducting current through the D1, $V_F$ is the zero-current forward ON-state voltage drop of the diode, and $R_F$ is the ON-state resistance of the diode.

6. The loss optimization control method for MMCs under fault-tolerant control according to claim 5, wherein calculation formulas for $P_{rec\_D2}$ and $P_{con\_D2}$ are:

$$\begin{cases} P_{rec\_D2} = \frac{1}{T}\sum_0^T \left[E_{rec}(i_{d2}(t)) \cdot \frac{U_{sm}}{U_{ref}}\right] \\ P_{con\_D2} = \frac{1}{T}\int_0^T i_{d2} \cdot (1-S) \cdot (V_F + R_F \cdot i_{d2} \cdot (1-S))dt \end{cases} \quad (5)$$

in the formulas (5), $i_{d2}$ is the conducting current through the D2.

7. The loss optimization control method for MMCs under fault-tolerant control according to claim 6, wherein the control period is the time interval between two acts of capacitor voltage sorting in the SMs of the arms.

* * * * *